United States Patent
Manev et al.

(10) Patent No.: US 6,280,699 B1
(45) Date of Patent: *Aug. 28, 2001

(54) METHOD FOR PREPARING SPINEL $LI_{1+X}MN_{2-X}O_{4+Y}$ INTERCALATION COMPOUNDS

(75) Inventors: Vesselin Manev; Walter Ebner; William Thompson; Stephen Dow, all of Gastonia, NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/332,644

(22) Filed: Jun. 14, 1999

Related U.S. Application Data

(63) Continuation of application No. 08/871,027, filed on Jun. 6, 1997, now Pat. No. 5,961,949, which is a continuation of application No. 08/756,496, filed on Nov. 26, 1996, now abandoned
(60) Provisional application No. 60/015,143, filed on Apr. 5, 1996.

(51) Int. Cl.[7] .......................... C01G 45/12; C01G 45/02; C01G 47/00; C01G 57/00; H01M 4/50
(52) U.S. Cl. .......................... 423/599; 423/605; 429/224
(58) Field of Search .................... 423/599, 605; 429/224

(56) References Cited

U.S. PATENT DOCUMENTS

| | | |
|---|---|---|
| 4,246,253 | 1/1981 | Hunter . |
| 4,246,324 | 1/1981 | de Nora et al. . |

(List continued on next page.)

FOREIGN PATENT DOCUMENTS

| | | |
|---|---|---|
| 0 688 739 A1 | 12/1995 | (EP) . |
| 728701 | 8/1996 | (EP) . |
| 9-147859 | 6/1997 | (JP) . |
| PCT/US95/13106 | 10/1995 | (WO) . |

OTHER PUBLICATIONS

Lithium Insertion Into Manganese Spinels, M.M. Thackeray, et al.; *Mater. Res. Bull.*, vol. 18, (1983) pp. 461–472.
Improved Capacity Retention in Rechargeable 4 V Lithium/Lithium—Manganese Oxide (Spinel) Cells; Gummow et al., *Solid State Ionics 69* (1994).

(List continued on next page.)

*Primary Examiner*—Steven P. Griffin
*Assistant Examiner*—Cam N. Nguyen
(74) *Attorney, Agent, or Firm*—Alston & Bird LLP

(57) ABSTRACT

A method of preparing a highly homogenous spinel $Li_{1+x}Mn_{2-x}O_{4+Y}$ intercalation compound having a predetermined mean particle size and particle size distribution for 4 V secondary lithium and lithium ion cells is provided. The method comprises mixing at least one manganese compound having a predetermined particle size distribution with at least one lithium compound wherein the manganese compound has a mean particle size of between about 1 and 15 microns and the mean particle size of the lithium compound is less than that of the manganese compound The mixture is then fired in one or more firing steps within specific temperature ranges to form the $Li_{1+x}Mn_{2-x}O_{4+Y}$ intercalation compound. Preferably, at least one firing step is at a temperature of between about 700° C. and 900° C. The $Li_{1+x}Mn_{2-x}O_{4+Y}$ intercalation compounds may be used in the positive electrodes of secondary lithium and lithium ion cells to provide cells having high specific capacity, cycleability, and charge-discharge rate capability.

25 Claims, 5 Drawing Sheets

U.S. PATENT DOCUMENTS

| | | | |
|---|---|---|---|
| 4,312,930 | 1/1982 | Hunter. | |
| 4,366,215 | 12/1982 | Coetzer et al. . | |
| 4,448,856 | 5/1984 | Zuckerbrod et al. . | |
| 4,507,371 | 3/1985 | Thackeray et al. . | |
| 4,546,058 | 10/1985 | Charkey et al. . | |
| 4,599,157 | 7/1986 | Suzuki et al. . | |
| 4,731,309 | 3/1988 | Hoffman . | |
| 4,732,741 | 3/1988 | Duncan et al. . | |
| 4,749,634 | 6/1988 | Sammells . | |
| 4,828,834 * | 5/1989 | Nagaura et al. | 429/194 |
| 4,946,664 | 8/1990 | Van Zyl et al. . | |
| 4,956,247 | 9/1990 | Miyazaki et al. . | |
| 4,959,282 * | 9/1990 | Dahn et al. | 429/224 |
| 4,975,346 | 12/1990 | Lecerf et al. . | |
| 4,980,251 | 12/1990 | Thackeray et al. . | |
| 5,023,155 | 6/1991 | Charkey et al. . | |
| 5,030,523 | 7/1991 | Neat et al. . | |
| 5,110,696 | 5/1992 | Shokoohi et al. . | |
| 5,135,732 | 8/1992 | Barboux et al. . | |
| 5,153,081 * | 10/1992 | Thackeray et al. | 429/194 |
| 5,160,712 | 11/1992 | Thackeray et al. . | |
| 5,166,012 | 11/1992 | Roussouw et al. . | |
| 5,169,736 | 12/1992 | Bittihn et al. . | |
| 5,192,629 | 3/1993 | Guyomard et al. . | |
| 5,196,278 | 3/1993 | Idota . | |
| 5,211,933 | 5/1993 | Barboux et al. . | |
| 5,240,794 | 8/1993 | Thackeray et al. . | |
| 5,244,757 | 9/1993 | Takami et al. . | |
| 5,266,299 | 11/1993 | Tarascon . | |
| 5,288,474 | 2/1994 | Reichert et al. . | |
| 5,290,592 | 3/1994 | Izuchi et al. . | |
| 5,294,499 | 3/1994 | Furukawa et al. . | |
| 5,312,611 | 5/1994 | Takami et al. . | |
| 5,316,875 | 5/1994 | Murai et al. . | |
| 5,316,877 | 5/1994 | Thackeray et al. . | |
| 5,370,071 | 12/1994 | Nagaura et al. . | |
| 5,389,467 | 2/1995 | Herr et al. . | |
| 5,415,957 | 5/1995 | Okada et al. . | |
| 5,425,932 | 6/1995 | Tarascon . | |
| 5,429,890 | 7/1995 | Pynenburg et al. . | |
| 5,443,929 | 8/1995 | Yamamoto et al. . | |
| 5,449,577 | 9/1995 | Dahn et al. . | |
| 5,462,820 | 10/1995 | Tanaka . | |
| 5,474,959 | 12/1995 | Schäfer et al. . | |
| 5,478,671 | 12/1995 | Idota . | |
| 5,478,672 | 12/1995 | Mitate . | |
| 5,478,673 | 12/1995 | Funatsu . | |
| 5,478,675 | 12/1995 | Nagaura . | |
| 5,478,676 | 12/1995 | Turi et al. . | |
| 5,487,960 | 1/1996 | Tanaka . | |
| 5,489,492 | 2/1996 | Asami et al. . | |
| 5,494,762 | 2/1996 | Isoyama et al. . | |
| 5,496,664 | 3/1996 | Sterr . | |
| 5,506,077 | 4/1996 | Koksbang . | |
| 5,561,006 * | 10/1996 | Lecerf et al. | 429/218 |
| 5,601,952 | 2/1997 | Dasgupta et al. . | |
| 5,604,057 * | 2/1997 | Nazri | 429/224 |
| 5,658,693 | 8/1997 | Thackeray et al. . | |
| 5,674,644 * | 10/1997 | Nazri | 429/224 |
| 5,702,679 * | 12/1997 | Sheargold et al. | 423/599 |
| 5,742,070 * | 4/1998 | Hayashi et al. | 252/182.1 |
| 5,807,646 * | 9/1998 | Iwata et al. | 429/224 |
| 5,820,790 * | 10/1998 | Amine et al. | 252/519.1 |
| 5,871,863 * | 2/1999 | Miyasaka | 429/218 |
| 5,879,654 * | 3/1999 | Van Ghemen et al. | 423/593 |
| 5,965,293 * | 10/1999 | Idota et al. | 429/218.1 |
| 6,048,643 | 4/2000 | van Ghemen et al. . | |

OTHER PUBLICATIONS

Crystallographic And Magnetic Properties Of Several Spinels Containing Trivalent JA—1044 Manganese; D.G. Wickham and W.J. Croft; *J. Phys. Chem. Solids*, vol. 7, (1958) pp. 351–360.

Rechargeable Lithium Battery With Spinel–Related λ—$MnO_2$; I. Synthesis of λ—$MnO_2$ for Battery Application; *Journal of Power Sources*, 43–44 (1993) pp. 551–559.

Rechargeable Lithium Battery With Spinel–Related $MnO_2$; II. Optimization of the $LiMn_2O_4$ Synthesis Conditions; Momchilov et al.; *Journal of Power Sources*, 41 (1993) pp. 305–314.

The Chemistry Of $LiMn_2O_4$ Formation; W.F. Howard, Jr. Rechargeable Lithium Battery With Spinel–Related λ–$MnO_2$; Part III. Scaling–Up Problems Associated With $LiMn_2O_4$ Synthesis; V. Manev et al.; Journal of Power Sources, (1995) pp. 1–6.

Rechargeable Lithium Battery With Spinel–Relatedλ–$MnO_2$; Part III. Scaling–Up Problems Associated With $LiMn_2O_4$ Synthesis; V. Manev et al.; *Journal of Power Sources*, (1995) pp. 1–6.

Preparation and Electrochemical Characterization of Micron–Sized Spinel $LiMn_2O_4$; Jiang et al; *J. Electrochem. Soc.*, vol. 143, No. 5, May 1996.

International Search Report for PCT/US97/05550 filed Feb. 4, 1997 completed Aug. 26, 1997 by J. Brebion.

Rechargeable Lithium Battery With Spinel–Relatedλ–$MnO_2$ III. Scaling–up Problems Associated with $LiMn_2O_4$ Synthesis, V. Manev et al., 6040 Journal of Power Sources 54(1995), No. 2, pp. 323–328.

A Model Lithium–Ion System Based On the Insertion Properties of the Spinel Phase $Li_xMn_2O_4$, (O<x<2), M. Y. Saidi et al., Elsevier Science, S.A., 1996, pp. 145–151.

Rechargeable $Li_{1+x}Mn_2O_4$/Carbon Cells With A New Electrolyte Composition, D. Guyomard et al., J. Electrochem. Soc., vol. 140, No. 11, Nov. 1993, pp. 3071–3081.

Synthesis of an Efficient $LiMn_2O_4$ for Lithium–Ion Cells, G. Pistoia et al., Elsevier Science S.A., 1996, pp. 135–138.

Structural Aspects of Lithium–Manganese–Oxide Electrodes For Rechargeable Lithium Batteries; M. H. Rossouw et al., Material Research Bulletin, vol. 25, No. 2, pp. 173–182, (1990).

Spinel Electrodes from the Li–Mn–O System for Rechargeable Lithium Battery Applications, M. M. Thackeray et al., J. Electrochem. Soc., vol. 139, No. 2, pp. 363–366, (Feb. 1992).

Lithium–Ion Secondary Battery—Materials and Applications, Chapter 12, "Lithium–Ion Battery Manufacturing Process", pp. 134–156, first edition, Mar. 29, 1996.

* cited by examiner

METHOD FOR PREPARING SPINEL $Li_{1+x}Mn_{2-x}O_{4+Y}$ INTERCALATION COMPOUNDS

CROSS-REFERENCE TO RELATED APPLICATIONS

This application is a continuation of U.S. application Ser. No. 08/871,027, filed Jun. 6, 1997, now U.S. Pat. No. 5,961,949 which is a continuation of U.S. application Ser. No. 08/756,496, filed Nov. 26, 1996, now abandoned, which claims the benefit of U.S. Provisional Application Serial No. 60/015,143, filed Apr. 5, 1996, under 35 U.S.C. § 119(e).

FIELD OF THE INVENTION

This invention relates to spinel $Li_{1+x}Mn_{2-x}O_{4+Y}$ intercalation compounds, and particularly to the use of spinel $Li_{1+x}Mn_{2-x}O_{4+Y}$ intercalation compounds in 4 V secondary lithium and lithium ion batteries.

BACKGROUND OF THE INVENTION

Heretofore, lithium intercalation compounds such as $Li_{1+x}Mn_{2-x}O_{4+Y}$ have been used in positive electrodes for 4 V secondary lithium and lithium ion batteries. The spinel $LiMn_2O_4$ intercalation compound was first obtained by Wickham and Croft by heating lithium carbonate and manganese oxide in a 1:2 lithium to manganese molar ratio. D. G. Wickham and W. J. Croft, *Crystallographic and Magnetic Properties of Several Spinels Containing Trivalent JA-1044 Manganese*; J. Phys. Chem. Solids 7, 351–360 (1958). As demonstrated in U.S. Pat. No. 4,426,253 to Hunter, the acid treatment of $LiMn_2O_4$ forms a $\lambda$-$MnO_2$ which can be used in a positive electrode for electrochemical power sources. It was later discovered that the spinel $LiMn_2O_4$ could be used as the positive electrode for a secondary lithium cell. Thackery et al., *Lithium Insertion Into Manganese Spinels*; Material Research Bulletin 18, 461–472 (1983).

The mean particle size and the particle size distribution are two of the basic properties characterizing the positive electrode intercalation materials for secondary lithium batteries. These properties are considered to be important because they directly influence the charge-discharge rate capability, the safety cell performance, the electrode formulation and the electrode coating process of positive electrodes containing these materials. In addition, a decrease in the mean particle size and distribution of the intercalation compounds typically results in an increase in the cycleability of these compounds. The reason for the increase in cycleability is that smaller particles are relatively more flexible than larger particles and therefore the changes in the crystal lattice parameters which occur during cycling do not damage the cycleability of the smaller particles to the degree that the larger particles are damaged.

Nevertheless, a decrease in the mean particle size results in a significant increase in the electronic resistivity of the spinel compounds. The electronic resistivity is controlled by the contact resistivity between the particles which rises significantly due to an increase in the number of contact boundaries which the electrons have to overcome. The increase in electronic resistivity leads to an increase in the electrode polarization which decreases both the specific capacity and charge-discharge rate capability of the electrode. Furthermore, a decrease in the particle size is generally coupled with an unwanted decrease in the tapped or powder density. Because many batteries such as batteries for electronics have fixed volumes, it is preferred that the spinel material used in the positive electrode of these batteries has a high tapped density, so there is essentially more chargeable material in the positive electrode. A higher tapped density results in a positive electrode having a higher overall capacity. Therefore, depending on the nature of the intercalation compounds and the electrode formulation, the cycleability, specific capacity, tapped density and charge-discharge rate of the spinel material should be considered in determining a desirable particle distribution for the spinel material.

Accordingly, these factors have been considered in the preparation of $LiCoO_2$ intercalation compounds, where the desired particle size has been achieved by grinding the $LiCoO_2$ material. Nevertheless, grinding $Li_{1+x}Mn_{2-x}O_{4+Y}$ intercalation compounds results in a considerable reduction in specific capacity. V. Manev et al., Rechargeable Lithium Battery With Spinel-Related $\lambda$-$MnO_2$. Part III. Scaling-up Problems Associated With $LiMn_2O_4$ Synthesis, J. Power Sources 54, 323–328 (1995). As described in this article, the reduction in specific capacity is due to changes in the $Li_{1+x}Mn_{2-x}O_{4+Y}$ structure which occur as a result of the stress of mechanical treatment, measured by the contraction of the crystal lattice parameter a. Therefore, grinding the $Li_{1+x}Mn_{2-x}O_{4+Y}$ material is not a desirable method of reducing the mean particle size and particle size distribution of spinel $Li_{1+x}Mn_{2-x}O_{4+Y}$ intercalation compounds.

SUMMARY OF THE INVENTION

The present invention provides a method of preparing a spinel $Li_{1+x}Mn_{2-x}O_{4+Y}$ intercalation compound having a predetermined mean particle size and particle distribution for 4 V secondary lithium and lithium ion cells having high cycleability, specific capacity, and charge-discharge rate capability.

The method of preparing the spinel $Li_{1+x}Mn_{2-x}O_{4+Y}$ intercalation compound comprises mixing at least one manganese compound with at least one lithium compound and firing the mixture in one or more steps within specific temperature ranges. The temperature ranges of the firing steps fall between about 450° C. and 900° C. with at least one firing step at a temperature of between about 700° C. and 900° C. to form the $Li_{1+x}Mn_{2-x}O_{4+Y}$ intercalation compound. Typically, the mean particle size of the lithium compound used to form the spinel is less than the mean particle size of the manganese compound thereby allowing the lithium particles to be uniformly dispersed with the manganese particles. Preferably, the manganese compound used to form the spinels has a predetermined mean particle diameter of between about 1 and 15 microns and a predetermined particle size distribution wherein at least about 99% of the particles have a diameter of less than about 40 microns. In addition, the manganese compounds preferably have a narrow particle size distribution wherein the maximum particle diameter is less than about 10 times the mean particle diameter and/or at least about 90% of the particles are distributed in a range not wider than about one order of magnitude.

The spinel $Li_{1+x}Mn_{2-x}O_{4+Y}$ intercalation compounds prepared according to the present invention have a predetermined mean particle size and particle size distribution generally corresponding to the size of the particles in the manganese compounds. Therefore, the predetermined mean particle size and particle size distribution is achieved without any additional mechanical treatment, e.g., grinding, of the spinel $Li_{1+x}Mn_{2-x}O_{4+Y}$ compounds. The $Li_{1+x}Mn_{2-x}O_{4+Y}$ intercalation compounds may be used in the positive electrodes of secondary lithium and lithium ion cells to provide cells having high cycleability, specific capacity and charge-discharge rate capability.

These and other features and advantages of the present invention will become more readily apparent to those skilled in the art upon consideration of the following detailed description and accompanying drawings which describe both the preferred and alternative embodiments of the present invention.

DETAILED DESCRIPTION OF THE INVENTION

Figure 1:
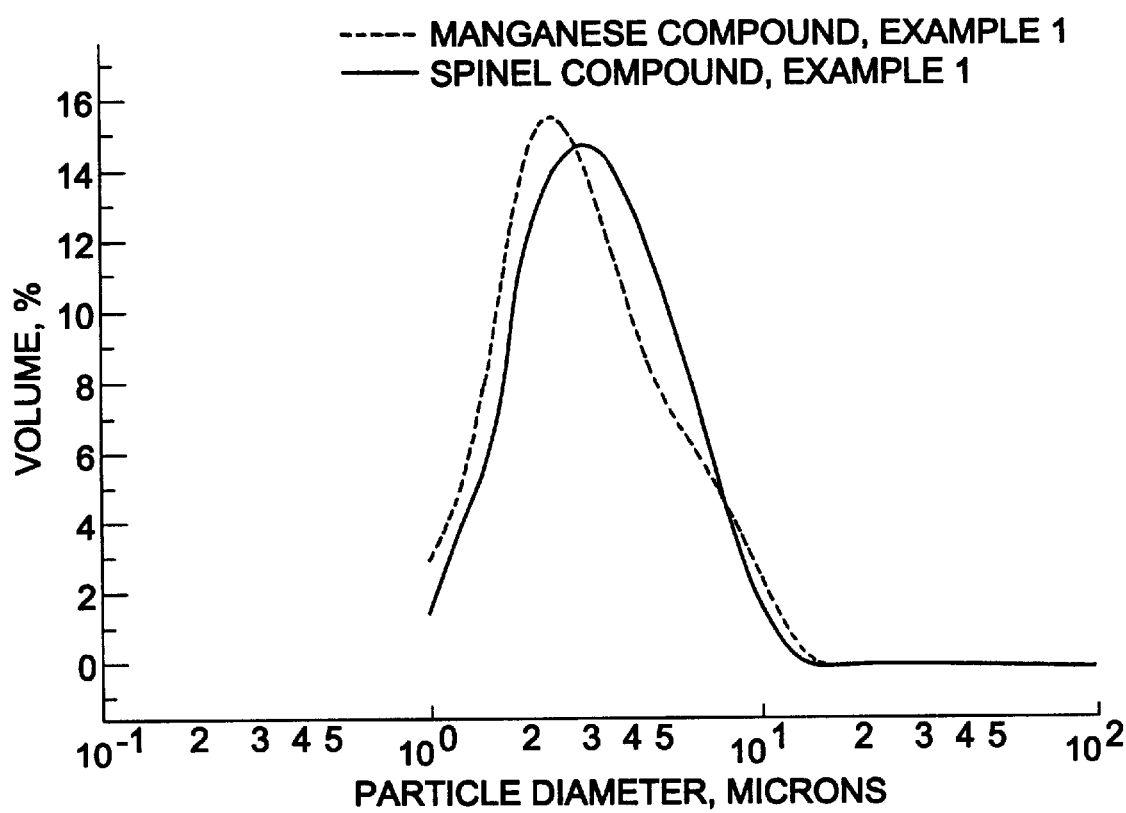
FIG. 1 is a graph illustrating the comparison between the particle size distributions of the starting $MnO_2$ and the spinel $Li_{1+X}Mn_{2-X}O_{4+Y}$ mixture obtained from firing a mixture of the $MnO_2$ and LiOH at 750° C. for 48 hours.

It has been discovered that according to the method of the present invention, spinel $Li_{1+X}Mn_{2-X}O_{4+Y}$ material having a predetermined mean particle size and a narrow particle distribution may be prepared without further mechanical treatment and losses in specific capacity, cycleability, tapped density and charge-discharge rate capability. The spinel $Li_{1+X}Mn_{2-X}O_{4+Y}$ material is prepared from a starting mixture which includes at least one manganese compound and at least one lithium compound. The at least one manganese compound is selected from the group consisting of manganese salts and manganese oxides. Exemplary manganese salts and oxides include $MnO_2$, $Mn_2O_3$, $Mn_3O_4$, $MnCO_3$, $MnSO_4$, $Mn(NO_3)_2$, MnOOH, $Mn(CH_3CO_2)_2$, and mixtures thereof. The at least one lithium compound is selected from the group consisting of lithium salts and lithium oxides. Exemplary lithium salts and oxides include $Li_2O$, LiOH, $LiNO_3$, $Li_2CO_3$, $Li_2SO_4$, $LiNO_3$, $LiCH_3CO_2$, and mixtures thereof. The at least one manganese compound and at least one lithium compound are mixed in a lithium to manganese mole ratio of between about 1.02:2 and 1.1:2.

In order to provide highly homogenous spinel $Li_{1+X}Mn_{2-X}O_{4+Y}$ intercalation compounds having a predetermined mean particle size and narrow particle distribution, the particle size of the starting materials, specifically the manganese compound is controlled. The manganese compound has a predetermined mean particle diameter of between about 1 and 15 microns, preferably between greater than 1 to about 15 microns and more preferably between about 5 and 15 microns, and a predetermined particle size distribution wherein at least about 99% of the particles have a diameter of less than about 40 microns. Additionally, the maximum particle diameter of the manganese compound is typically less than about 10 times the mean particle diameter and preferably less than about 5 times the mean particle diameter. The manganese compound is preferably highly homogeneous wherein at least about 90% of the manganese compound particles are distributed in a range not wider that about one order of magnitude. The manganese compound may be ground such as by a ball or jet mill to provide the desired particle size used in the invention.

The lithium compound used to form the spinel $Li_{1+X}Mn_{2-X}O_{4+Y}$ intercalation compounds of the present invention typically has a smaller mean particle size than the manganese compound used. Preferably, the mean particle size of the lithium compound is at least two to three times lower than that of the manganese compound. The smaller particle size lithium compounds become more uniformly dispersed with the manganese compound particles upon mixing to provide more homogenous spinel compounds with increased cycling lives. Preferably, the mean particle size of the lithium compound is between about 0.5 and 5 microns, more preferably between about 1 and 3 microns. The lithium compound may be ground such as by a ball or jet mill to provide the desired particle size used in the invention. However, the lithium compound and manganese compound are preferably ground separately to provide a lithium compound having a smaller mean particle size than that of the manganese compound used in the invention.

In order to form the spinel $Li_{1+X}Mn_{2-X}O_{4+Y}$ intercalation compounds, the at least one manganese compound having a predetermined particle size and particle distribution and the at least one lithium compound having a predetermined mean particle size less than that of the manganese compound are mixed together and fired in one or more steps within specific temperature ranges which fall between 450° C. and 900° C. Preferably, at least one firing step is at a temperature of between about 700° C. and 900° C. In this firing step, the temperature is maintained between about 700° C. and 900° C. for a soak time of at least about 10 hours, and preferably for at least about 24 hours, to form the spinel $Li_{1+X}Mn_{2-X}O_{4+Y}$ material. In order to provide a spinel having enhanced properties, the mixture may be subjected to an additional firing step at a temperature range of between about 400° C. and 600° C. for at least about 12 hours prior to the 700° C.–900° C. firing step. Additionally, the mixture is generally fired in the presence of a gas flow such as air or a gas mixture containing from 5 to 100 percent oxygen by volume. Suitable firing step sequences are described in commonly owned applications entitled "Highly Homogenous Spinel $Li_{1+X}Mn_{2-X}O_4$ Intercalation Compounds and Method for Preparing Same", Ser. Nos. 08/665,396 (U.S. Pat. No. 5,792,442 and 08/665,408 (U.S. Pat. No. 5,745,9607), filed concurrently on Jun. 18, 1996 and incorporated herein in their entirety by reference.

Any of the firing steps used to form the spinel may include changes in the temperature within the described ranges. In other words, the temperature may be increased or decreased within the described ranges during the firing step. Although the firing temperatures are preferably maintained for the soak times described above, longer soak times tend to provide an improved spinel compound. Nevertheless, the soak times are typically dictated by commercial feasibility and extremely long soak times may not be desired.

In accordance with one aspect of the present invention a spinel $Li_{1+X}Mn_{2-X}O_{4+Y}$ with strictly defined particle size and particle size distribution is provided by firing a reaction mixture of the manganese compound and the lithium compound in one or more firing steps with at least one firing step at a temperature of between about 700° C. and 800° C., preferably between about 730° C. and 770° C., and more preferably up to about 750° C. In this temperature range, the particle size distribution of the final $Li_{1+x}Mn_{2-x}O_{4+Y}$ essentially corresponds to the particle size distribution of the starting manganese compound.

In accordance with another aspect of the present invention, a spinel $Li_{1+x}Mn_{2-x}O_{4+Y}$ with controlled particle size and particle size distribution is provided by firing a reaction mixture of the manganese compound and the lithium compound in one or more firing steps with at least one firing step at a temperature of between about 800° C. and 900° C., preferably between about 800° C. up to about 850° C., and more preferably about 825° C. In this temperature range, the particle size distribution of the $Li_{1+x}Mn_{2-x}O_{4+Y}$ spinel material is is directly related to the particle size distribution of the starting manganese compound Nevertheless, in this temperature range, there is generally an offset between the particle size distribution of the $Li_{1+x}Mn_{2-x}O_{4+Y}$ material and the particle size distribution of the starting manganese compound corresponding to an increase in the particle size of the spinel material at the higher temperature range. For example, the mean particle size of the spinel is between about 10 and 15 microns when the mean particle size of the manganese compound is between about 6 and 7 microns when the starting materials are fired at between about 800° C. and 900° C. In both the low temperature range (700° C.–800° C.) and the high temperature range (800° C.–900° C.), the $Li_{1+x}Mn_{2-x}O_{4+Y}$ intercalation compounds are highly homogenous and possess a high specific capacity, cycleability, tapped density and charge-discharge rate capability.

The spinel $Li_{1+x}Mn_{2-x}O_{4+Y}$ intercalation compounds prepared according to the present invention possess improved properties over conventional $Li_{1+x}Mn_{2-x}O_{4+Y}$ spinels. The spinel $Li_{1+x}Mn_{2-x}O_{4+Y}$ of the invention is a highly ordered and homogeneous structure having a low capacity fade during cycling. The improved physicochemical and electrochemical properties of the $Li_{1+x}Mn_{2-x}O_{4+Y}$ spinels of the invention are independent of the specific manganese and lithium compounds used to form the spinel but are dependent instead on the particle size of the manganese and lithium compounds.

The spinel $Li_{1+x}Mn_{2-x}O_{4+Y}$ compounds may be used in positive electrodes in electrochemical cells. The $Li_{1+x}Mn_{2-x}O_{4+Y}$ spinel material is typically combined with a conductive agent such as graphite or carbon black and a binder material such as polyvinylidene difluoride (PVDF) and dispersed in a solvent such as n-methyl pyrrolidinone (NMP) (e.g. 1-methyl-2-pyrrolidinone) to form a slurry. The slurry is typically spread on an aluminum current collector and then heated to evaporate the solvent to form a dry electrode material. The dry electrode is then compressed by rolling, pressing, or other known methods, and cut into, for example, a disk, to form the positive electrode. The electrode is then placed inside an electrochemical cell with a lithium counterelectrode and an electrolyte such as $EC:DMC/LiPF_6$.

The present invention will be further illustrated by the following nonlimiting examples.

EXAMPLE 1

Chemical grade $MnO_2$ particles were subjected to preliminary grinding until a mean particle size of 2 microns was obtained. The $Li_{1.025}Mn_{1.975}O_4$ sample was produced by heating a 500 g mixture of the ground $MnO_2$ and LiOH at a molar ratio 2Li:Mn=1.05. The mixture was then fired for 48 h at 750° C. in a muffle furnace. The spinel material was cooled by removing the material from the furnace.

The effect of the particle size distribution of the starting $MnO_2$ having a mean particle size of 2 microns on the particle size distribution of the $Li_{1.025}Mn_{1.975}O_4$ is illustrated in FIG. 1. FIG. 1 shows that the particle size distributions of the $MnO_2$ starting material and the final $Li_{1.025}Mn_{1.975}O_4$ correspond remarkably well.

EXAMPLE 2

The $MnO_2$ used in Example 1 was mixed with $LiCO_3$ at a molar ratio 2Li:Mn=1.1 and fired for 48 h at 850° C. in a muffle furnace. The spinel material was cooled by removing the spinel material from the furnace.

Figure 2:
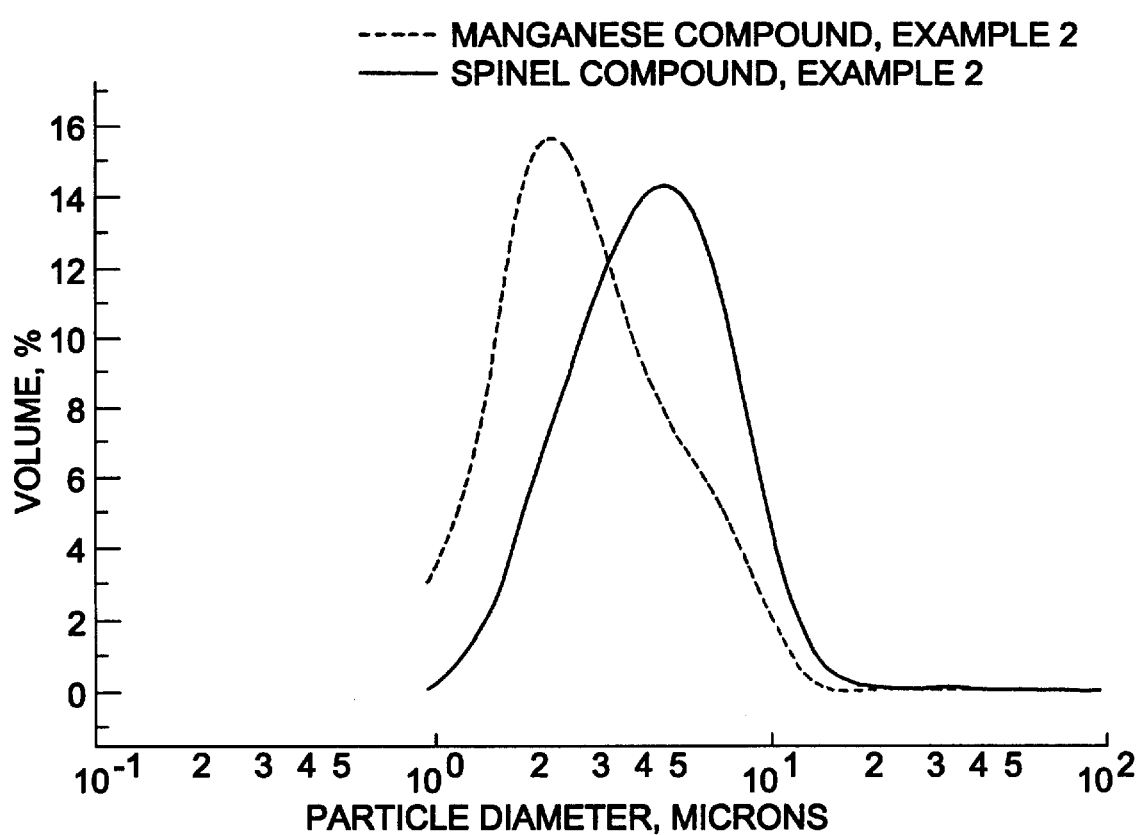
FIG. 2 is a graph illustrating the comparison between the particle size distributions of the starting $MnO_2$ and the spinel $Li_{1+X}Mn_{2-X}O_{4+Y}$ compound obtained from firing a mixture of the $MnO_2$ and $Li_2CO_3$ at 850° C. for 48 hours.

The effect of the particle size distribution of the starting $MnO_2$ having a mean particle size of 2 microns on the particle size distribution of the final $Li_{1.05}Mn_{1.195}O_4$ is illustrated in FIG. 2. As shown in FIG. 2, firing the $MnO_2$ and $LiCO_3$ at 850° C. shifts the particle size distribution curve of the $Li_{1.05}Mn_{1.95}O_4$ spinel particles to higher values than those obtained using the 750° firing. Despite the higher particle size resulting from 850° C. firing, the distribution transforms into an even more symmetrical distribution curve with the maximum particle size of the final product slightly exceeding the maximum particle size of the starting manganese compound. Therefore, as with the material fired at 750° C. in Example 1, the particle size and particle size distribution can be defined by particle size distribution curve of the starting compound and by calculation of the offset of the distribution curves after the firing on the basis of the preliminarily obtained experimental data.

EXAMPLE 3

$MnCO_3$ was subjected to preliminary grinding until a compound with mean particle size of 9 microns was obtained. The $Li_{1.025}Mn_{1.975}O_4$ sample was produced by heating a 500 g mixture of the ground $MnCO_3$ and $LiNO_3$ at a molar ratio of 2Li:Mn=1.05. The mixture was fired for 48 h at 750° C. in a muffle furnace. The synthesized spinel was cooled by removing the spinel material from the furnace.

Figure 3:
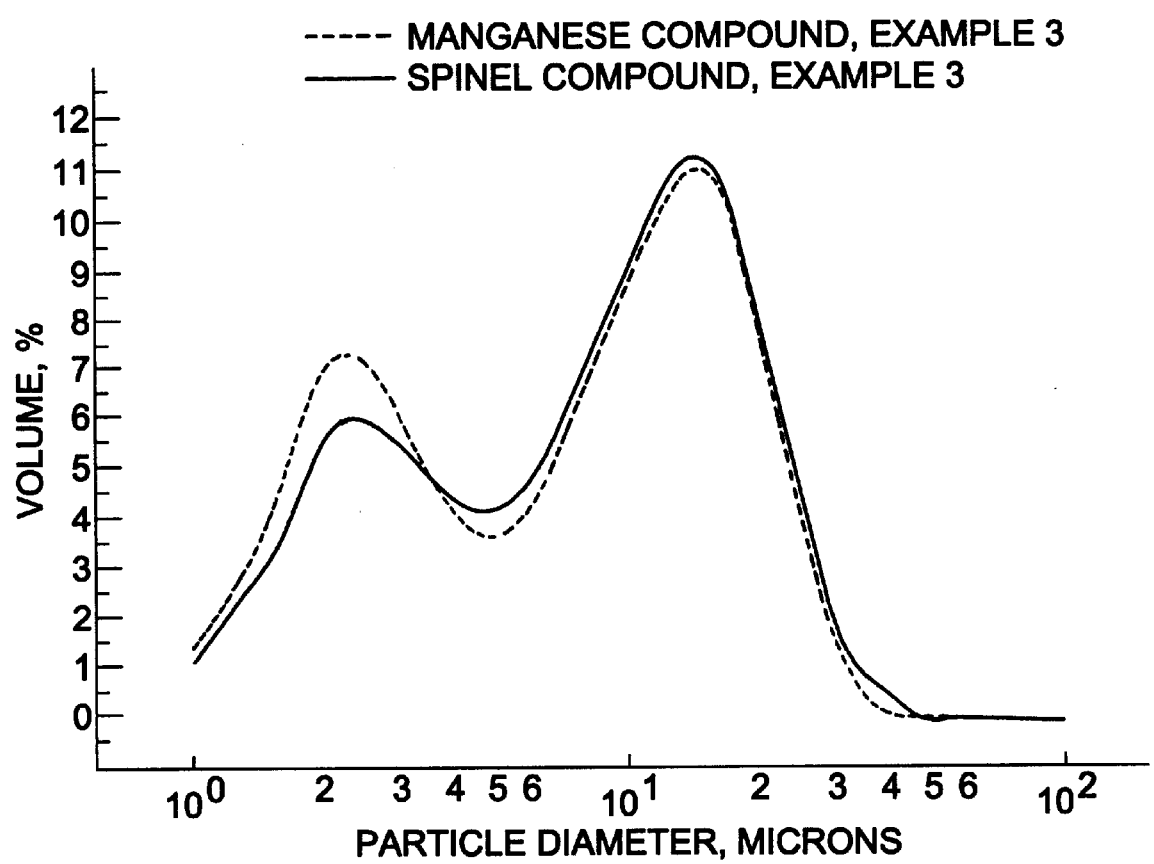
FIG. 3 is a graph illustrating the comparison between the particle size distributions of the starting $MnCO_3$ and the spinel $Li_{1+X}Mn_{2-X}O_{4+Y}$ compound obtained from firing a mixture of the $MnCO_3$ and $LiNO_3$ at 750° C. for 48 hours.

Even though a small difference is observed in FIG. 3 in the particle size distribution of the starting $MnCO_3$ and the final spinel $Li_{1.025}Mn_{1.975}O_4$, the difference between the mean particle size of these materials is negligible. The comparison between the mean particle diameters of the starting $MnCO_3$, (8.49 microns) and the mean diameter of the final spinel $Li_{1.025}Mn_{1.975}O_4$, (8.88 microns) shows only a 4.5% change from the initial value of the manganese compound.

EXAMPLE 4

The $Li_{1.025}Mn_{1.975}O_4$ sample was produced by heating a 500 g mixture of the $MnCO_3$ in Example 3 and $Li_2CO_3$ with a mean particle size of 2.5 microns at a molar ratio of 2Li/Mn=1.05. After a preliminary treatment at 550° C. and 750° C., the mixture was fired at 850° C. for 48 hours in a muffle furnace. The synthesized spinel was cooled at a cooling rate of 50° C./hour.

The prepared spinel $Li_{1.025}Mn_{1.975}O_4$ compound was mixed with 10% graphite and 5% PVDF binder dissolved in NMP solvent to form a slurry. The slurry was spread on aluminum foil and heated to evaporate the NMP solvent. The dry electrode was then pressed at 500 kg/cm² and cut into a disk test sample electrode having a diameter of about 1 cm and a thickness of about 0.015 cm. The prepared test electrode was placed inside an electrochemical cell with a lithium counter electrode and with EC:DMC/LiPF$_6$ electrolyte. and a charging-discharging test was conducted at 1 h charge-discharge rate and 3–4.5 V voltage limits.

COMPARATIVE EXAMPLE 1

The Li$_{3+X}$Mn$_{2-X}$O$_{4+Y}$ sample was produced by heating a 500 g mixture of the MnCO$_3$ in Example 3 and Li$_2$CO$_3$ with a mean particle size of 36 microns at a molar ratio of 2Li/Mn=1.05. The synthesis conditions were exactly the same as in Example 4, where after a preliminary treatment at 550° C. and 750° C., the mixture was fired for 48 hours at 850° C. in a muffle furnace. The synthesized spinel was cooled at a cooling rate of 50° C./hour. A spinel Li$_{1.025}$Mn$_{1.975}$O$_4$ positive test electrode was prepared in the same manner as in Example 4, an electrochemical cell was assembled in the same manner as in Example 4, and the cell charge-discharge characteristics were measured under the same conditions as Example 4.

COMPARATIVE EXAMPLE 2

The Li$_{1.025}$Mn$_{1.975}$O$_4$ sample was prepared by grinding the spinel Li$_{1.025}$Mn$_{1.975}$O$_4$ compound described in Example 4 in a ball mill for about 10 minutes. A spinel Li$_{1.025}$Mn$_{1.975}$O$_4$ positive test electrode was prepared in the same manner as in Example 4, an electrochemical cell was assembled in the same manner as in Example 4, and the cell charge-discharge characteristics were measured under the same conditions as Example 4.

Figure 4:
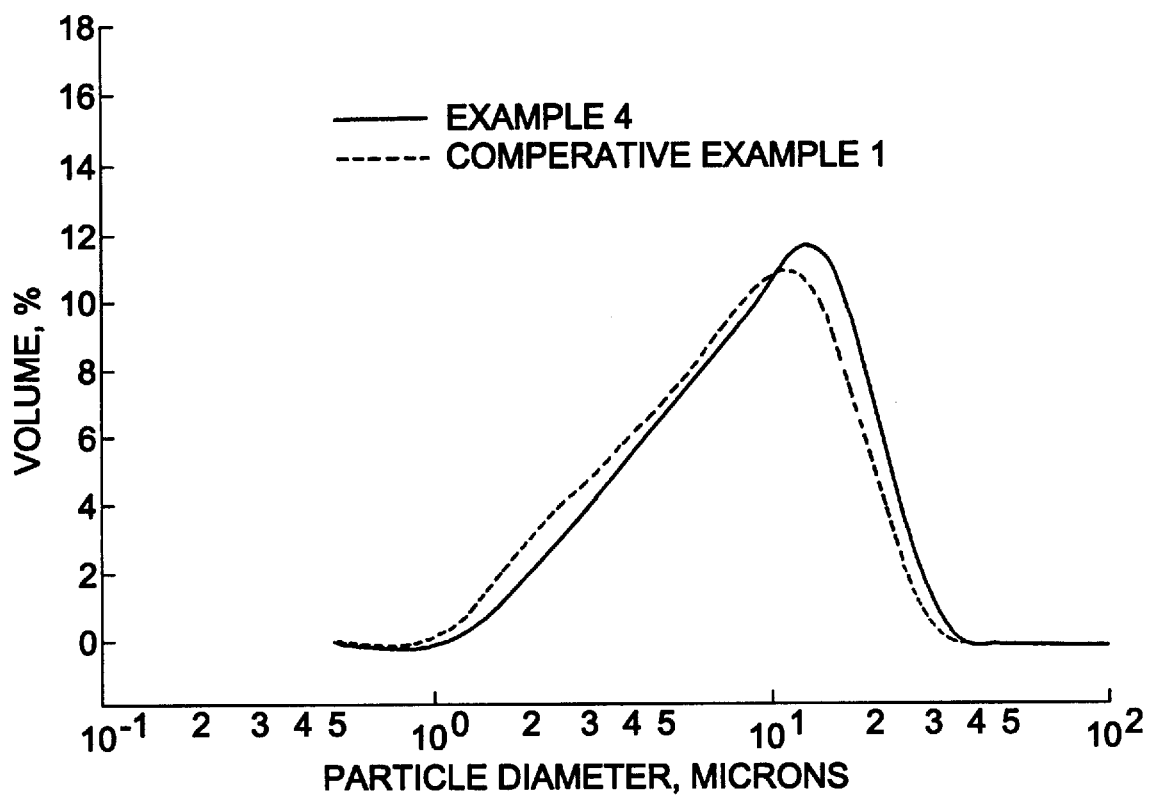
FIG. 4 is a graph illustrating the comparison between the particle size distribution of a spinel prepared according to the invention and a spinel prepared from a lithium compound having a larger mean particle size according to a comparative example.

The comparison between the particle size distribution of the spinel compound prepared according to Example 4 and Comparative Example 1 is illustrated in FIG. 4. FIG. 4 demonstrates that the particle size of the lithium compound, which differs in the two examples by more than one order of magnitude, does not have any effect on the particle size distribution of the final spinel compound. However, as shown in Table 1 below, the comparison between the cycleability of the spinel compounds prepared according to the Example 4 and Comparative Example 1 demonstrates that the cycleability of the spinel prepared by using a lithium compound with a smaller particle size than the manganese compound is considerably better than the cycleability of the spinel prepared by using a lithium compound with a larger particle size than the manganese compound. Specifically, after fifty cycles, the specific capacity of the spinel in Example 4 decreases only 2.4% compared to 8.1% for Comparative Example 1.

TABLE 1

| | Specific capacity (mAh/g) | | |
|---|---|---|---|
| | First Cycle | Twentieth Cycle | Fiftieth Cycle |
| EXAMPLE 4 | 123 | 121 | 120 |
| COMPARATIVE EXAMPLE 1 | 124 | 117 | 114 |

Figure 5:
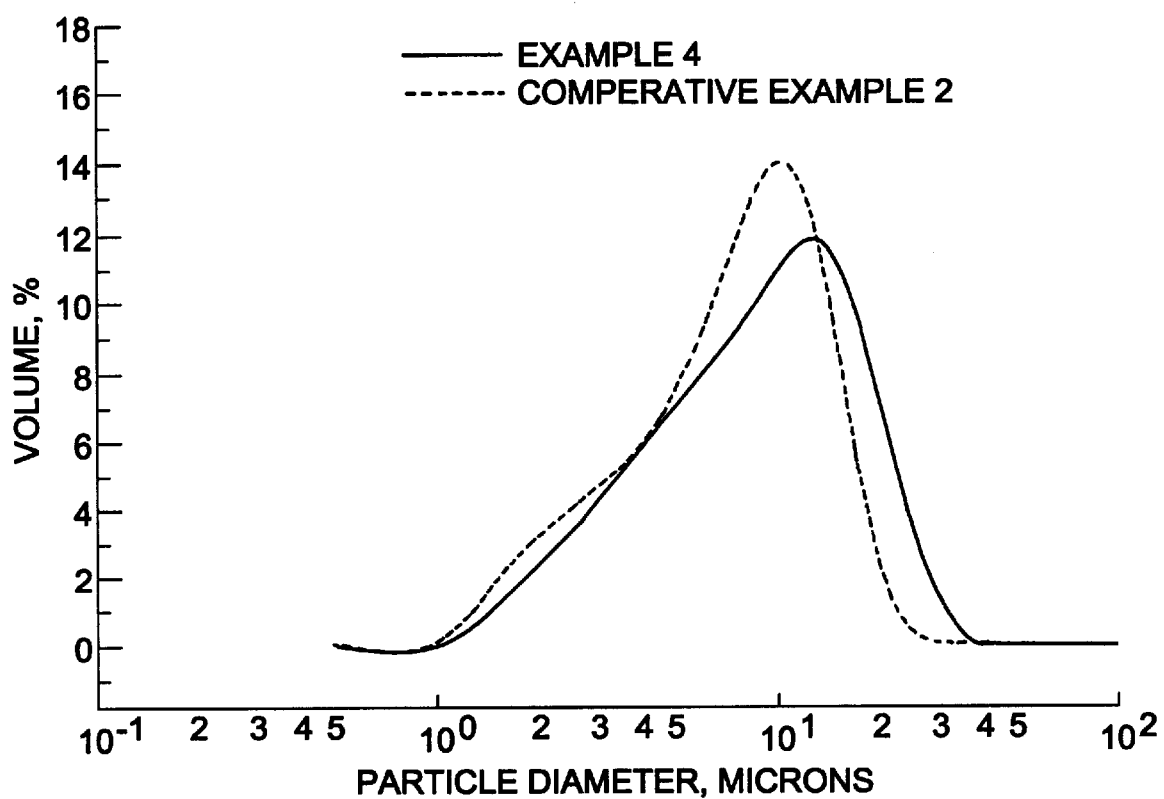
FIG. 5 is a graph illustrating the comparison between the particle size distribution of a spinel prepared according to the present invention and the same spinel compound ground for about 10 minutes in a ball mill according to a comparative example.

The comparison between the particle size distribution of the spinel prepared according to Example 4 and the particle size distribution curve of the ground spinel according to Comparative Example 2 is illustrated in FIG. 5. FIG. 5 shows a negligible decrease in the particle size distribution after the grinding procedure. In contrast, Table 2 demonstrates the comparison between the specific capacity of the spinels after numerous cycles. As shown in Table 2, both the initial specific capacity and the cycleability of the spinel is considerably decreased after grinding the spinel particles. In particular, the specific capacity of Example 4 after fifty cycles decreases only 2.4% compared to 11.8% for Comparative Example 2. This shows that grinding of the final spinel Li$_{1+X}$Mn$_{2-X}$O$_{4+Y}$ results in a strong negative effect on its electrochemical performance.

TABLE 1

| | Specific capacity (mAh/g) | | |
|---|---|---|---|
| | First Cycle | Twentieth Cycle | Fiftieth Cycle |
| EXAMPLE 4 | 123 | 121 | 120 |
| COMPARATIVE EXAMPLE 1 | 119 | 110 | 105 |

It is understood that upon reading the above description of the present invention, one skilled in the art could make changes and variations therefrom. These changes and variations are included in the spirit and scope of the following appended claims.

That which is claimed:

1. A method of preparing a spinel Li$_{1+X}$Mn$_{2-X}$O$_{4+Y}$ intercalation compound comprising:

mixing at least one manganese compound selected from the group consisting of manganese salts and oxides with at least one lithium compound selected from the group consisting of lithium salts and oxides, wherein the manganese compound consists of particles having a mean particle diameter of between about 1 and 15 microns and the mean particle size of the lithium compound is less than the mean particle size of the manganese compound; and firing the mixture from the mixing step in one or more steps within specific temperature ranges to form the spinel Li$_{1+X}$Mn$_{2-X}$O$_{4+Y}$ intercalation compound wherein at least one step is at a temperature of between about 700° C. and 900° C.

2. The method according to claim 1 wherein the firing step comprises firing the mixture at a temperature of between about 700° C. and 800° C.

3. The method according to claim 1 wherein the firing step comprises firing the mixture at a temperature of between about 800° C. and 900° C.

4. The method according to claim 1 wherein the manganese compound particles of the mixing step have a maximum particle diameter of not greater than about 10 times the mean particle diameter.

5. The method according to claim 1 wherein at least about 99% of the manganese compound particles has a particle diameter of not greater than about 40 microns.

6. The method according to claim 1 wherein at least about 90% of the manganese compound particles are distributed in a range not wider than about one order of magnitude.

7. The method according to claim 1 wherein the firing step comprises firing the mixture at a temperature of between about 730° C. and 770° C.

8. The method according to claim 1 wherein the firing step comprises firing the mixture at a temperature of 750° C.

9. The method according to claim 1 wherein the firing step comprises firing the mixture at a temperature of between about 800° C. and 850° C.

10. The method according to claim 1 wherein the firing step comprises firing the mixture at a temperature of 850° C.

11. The method according to claim 1 wherein the manganese compound is selected from the group consisting of $MnO_2$, $Mn_2O_3$, $Mn_3O_4$, $MnCO_3$, $Mn(NO_3)_2$, $MnOOH$, $Mn(CH_3CO_2)_2$, and mixtures therefore.

12. The method according to claim 1 wherein the lithium compound is selected from the group consisting of $Li_2O$, $LiOH$, $LiNO_3$, $Li_2CO_3$, $Li_2SO_4$, $LiNO_3$, $LiCH_3CO_2$, and mixtures thereof.

13. The method according to claim 1 wherein the mean particle size of the manganese compound is greater than 1 to about 15 microns.

14. The method according to claim 1 wherein the firing step comprises firing the mixture for a period of at least about 24 hours.

15. The method according to claim 1 further comprising grinding the manganese compound prior to said mixing step.

16. A method of preparing a positive electrode for an electrochemical cell comprising:
(a) mixing at least one manganese compound selected from the group consisting of manganese salts and oxides with at least one lithium compound selected from the group consisting of lithium salts and oxides, wherein the manganese compound consists of particles having a mean particle diameter of between about 1 and 15 microns and the mean particle size of the lithium compound is less than the mean particle size of the manganese compound;
(b) firing the mixture from the mixing step in one or more steps within specific temperature ranges to from a spinel $Li_{1+X}Mn_{2-X}O_{4+Y}$ intercalation compound wherein at least one step is at a temperature of between about 700° C. and 900° C.;
(c) dispersing the $Li_{1+X}Mn_{2-X}O_{4+Y}$ spinel intercalation compound in a solvent with a conductive agent and a binder material to from a slurry;
(d) heating the slurry to evaporate the solvent to from a dry electrode;
(e) compressing the dry electrode; and
(f) cutting the dry electrode to from a positive electrode for an electrochemical cell.

17. The method according to claim 16 wherein the firing step comprises firing the mixture at a temperature of between about 700° C. and 800° C.

18. The method according to claim 16 wherein the firing step comprises firing the mixture at a temperature of between about 800° C. and 900° C.

19. The method according to claim 16 wherein the manganese compound particles of the mixing step have a maximum particle diameter of not greater than about 10 times the mean particle diameter.

20. The method according to claim 16 wherein at least about 99% of the manganese compound particles has a particle diameter of not greater than about 40 microns.

21. The method according to claim 16 wherein at least about 90% of the manganese compound particles are distributed in a range not wider than about one order of magnitude.

22. The method according to claim 16 wherein the mean particle size of the manganese compound is greater than 1 to about 15 microns.

23. The method according to claim 16 wherein the firing step comprises firing the mixture for a period of at least about 24 hours.

24. A method of preparing a spinel $Li_{1+X}Mn_{2-X}O_{4+Y}$ intercalation compound comprising:
mixing at least one manganese compound selected from the group consisting of manganese salts and oxides with at least one lithium compound selected from the group consisting of lithium salts and oxides, wherein the manganese compound consists of particles having a mean particle diameter of between about 1 and 15 microns and at least about 99% of the manganese compound particles has a particle diameter of not greater than about 40 microns; and
firing the mixture from the mixing step in one or more steps within specific temperature ranges to form the spinel $Li_{1+X}Mn_{2-X}O_{4+Y}$ intercalation compound wherein at least one step is at a temperature of between about 700° C. and 900° C.

25. A method of preparing a spinel $Li_{1+X}Mn_{2-X}O_{4+Y}$ intercalation compound comprising:
mixing at least one manganese compound selected from the group consisting of manganese salts and oxides with at least one lithium compound selected from the group consisting of lithium salts and oxides, wherein the manganese compound consists of particles having a mean particle diameter of between about 1 and 15 microns and at least about 90% of the manganese compound particles are distributed in a range not wider than about one order of magnitude; and
firing the mixture from the mixing step in one or more steps within specific temperature ranges to form the spinel $Li_{1+X}Mn_{2-X}O_{4+Y}$ intercalation compound wherein at least one step is at a temperature of between about 700° C. and 900° C.

* * * * *

UNITED STATES PATENT AND TRADEMARK OFFICE
CERTIFICATE OF CORRECTION

PATENT NO.    : 6,280,699 B1
DATED         : August 28, 2001
INVENTOR(S)   : Manev et al.

It is certified that error appears in the above-identified patent and that said Letters Patent is hereby corrected as shown below:

<u>Title page,</u>
Item [57] ABSTRACT, line 10, after "compound" insert -- a period (.) --.

<u>Column 8,</u>
Line 13, in the sub-heading, "TABLE 1" should read -- TABLE 2 --;
Line 20, "EXAMPLE 1" should read -- EXAMPLE 2 --.

<u>Column 9,</u>
Line 5, after "$MnCO_3$," insert -- $MnSO_4$, --;
Line 6, "therefore" should read -- thereof --.

Signed and Sealed this

Fourteenth Day of May, 2002

*Attest:*

JAMES E. ROGAN
*Attesting Officer*    *Director of the United States Patent and Trademark Office*